United States Patent [19]
Yamamuro

[11] Patent Number: 5,544,134
[45] Date of Patent: Aug. 6, 1996

[54] OPTICAL DISK APPARATUS FOR READING DATA FROM ZONES OF AN OPTICAL DISK USING DIFFERENT FREQUENCY CLOCKS

[75] Inventor: Mikio Yamamuro, Zushi, Japan

[73] Assignee: Kabushiki Kaisha Toshiba, Kawasaki, Japan

[21] Appl. No.: 312,838

[22] Filed: Sep. 27, 1994

[30] Foreign Application Priority Data

Sep. 29, 1993 [JP] Japan .................................. 5-242501

[51] Int. Cl.⁶ .................................................. G11B 7/085
[52] U.S. Cl. ................. 369/32; 369/50; 369/54; 369/58; 369/48
[58] Field of Search ................... 369/32, 44.28, 369/47–48, 50, 54, 58, 111, 124; 360/51

[56] References Cited

U.S. PATENT DOCUMENTS

5,193,034   3/1993   Tsuyoshi et al. ........................... 360/51
5,432,762   7/1995   Kubo ......................................... 369/32

Primary Examiner—W. R. Young
Attorney, Agent, or Firm—Cushman, Darby & Cushman

[57] ABSTRACT

The optical disk formatted by the M.CAV mode has a plurality of tracks for recording data, arranged in a substantially coaxial manner, which are divided into a plurality of zones in its radial direction. Each track is divided into a plurality of sectors, each of which being handled as a unit region for recording data. The tracks in the same zone have the same number of sectors, and tracks in different zones have a different number of sectors. In the header region of each sector, the header data for specifying the sector is prerecorded, and a data field for recording data is provided following this header. In an apparatus for reading out data on a disk formatted as described above, data is read out from the data field based on a data clock having a frequency which varies from one zone to another. When a track of a different zone is accessed, the data of the track is read out based on the clock for reading the target track. It is then demodulated based on the data clock recorded in the header data, and the access operation is carried out once again.

8 Claims, 6 Drawing Sheets

| ZONE NUMBER | SECTOR/ROUND | FREQUENCY DEVIATION |
|---|---|---|
| 1 | 30 | |
| | | 6.7 % |
| 2 | 32 | |
| | | 5.9 % |
| 3 | 34 | |
| | | 5.6 % |
| 4 | 36 | |
| | | 5.3 % |
| ⋮ | ⋮ | ⋮ |
| | | 4.2 % |
| 10 | 50 | |

OPTICAL DISK APPARATUS FOR READING DATA FROM ZONES OF AN OPTICAL DISK USING DIFFERENT FREQUENCY CLOCKS

BACKGROUND OF THE INVENTION

1. Field of the Invention

The present invention relates to an optical disk apparatus, and more specifically to the type of optical disk apparatus which records/reproduces data on/from an optical disk having a plurality of tracks grouped into a plurality of zones arranged in its radial direction, using a particular frequency clock for a different zone.

2. Description of the Related Art

Optical disks are formatted in advance for achieving a large storing capacity, reproduction of data accurately from a target address, and storage of data accurately into a target address. There are two known formatting modes, i.e. the CLV (constant linear velocity) mode in which the rotation of the motor is controlled in inversely proportional to the radius of the track, and the track is followed at a constant linear speed at all times, and the CAV (constant angular velocity) mode in which the rotation of the optical disk is set at constant.

As compared to the CLV mode, the CAV mode provides an easier control of the motor which rotates the optical disk; however, it has conventionally been limited to a small memory capacity. In order to increase the memory capacity of the optical disk using the CAV mode, the Z.CAV (zone constant angular velocity) mode or the M.CAV (modified constant angular velocity) mode is used as a further formatting method. In either of the Z.CAV mode or the M.CAV mode, an optical disk is divided into a plurality of zones each formed of a plurality of tracks arranged in its radial direction. Each zone has the same number of selectors per one track within that zone, and a different zone has the different number of selectors per one track. According to the Z.CAV mode, when data is stored onto an optical disk or when data is reproduced therefrom, the optical disk is rotated at a constant speed, and the storing or reproducing operation is carried out by using an optical head with reference to a particular frequency clock which is different from one zone to another. More specifically, each time the optical head accesses a track of a different zone, the reference clock frequency is renewed. Then, data is stored in the track, and the data is reproduced from the track.

On an optical disk formatted in the Z.CAV mode, a sector mark is stored in the header. That is, pre-format data, and address data is also stored therein to follow the sector mark. In order to access to a target track, the following access operation is usually carried out. The sector mark of the track currently reproduced is detected, and the address data which follows the sector mark is read. Then, the difference between the target track to be accessed and the track currently being read is calculated, and the optical head is moved over the number of tracks which corresponds to the difference.

However, such an optical disk formatted by the Z.CAV mode has a drawback, in which the normal accessing operation cannot be recovered if an error ever occurs during the access operation. More specifically, the optical head moves to a location apart from the target zone by an erroneous access operation, the sector mark cannot be detected with reference to the clock of the zone to which the target track belong, and the address data cannot be read. Consequently, the optical disk apparatus cannot carry out the following operation for correcting the erroneous access operation.

As described above, with the optical disk which employs the format by which the disk is divided into a plurality of zones each formed of a plurality of tracks arranged in the radial direction, the address cannot be read if the optical head moves to a location other than the target zone, taking a great amount of time in access operation.

SUMMARY OF THE INVENTION

An object of the present invention is to provide an optical disk apparatus capable of accurate and quick accessing to data with regard to an optical disk divided into a plurality of zones each formed of a plurality of tracks arranged in the radial direction.

Another purpose of the present invention is to provide an optical disk apparatus operating with an optical disk divided into a plurality of zones each formed of a plurality of tracks arranged in the radial direction, which is capable of correcting a data clock to the particular frequency of a zone even if the optical head moves to a location apart from the target zone.

According to the present invention, there is provided an optical data reproducing apparatus for reproducing data from an optical disk having a plurality of tracks for storing data, arranged in a coaxial manner, the tracks are grouped into a plurality of zones partioning the optical disk along a radial direction thereof, and each zone has a plurality of sectors each assigned as a unit area for recording data, the tracks in the same zone divided by the same number of sectors, and the sectors of each zone storing a data clock which have a different frequency from one zone to another, for reading out data from the sector regions of the zone, the apparatus comprising:

means for rotating the optical disk at a constant rotation speed;

means for converging an optical beam on a track of the optical disk, and detecting an optical beam reflecting from the optical disk, thereby generating a reproduction signal;

means for moving the converging means in a radial direction of the disk.;

memory means for storing frequencies of clocks which are different from one zone to another;

means for driving the moving means by generating a driving signal corresponding to a target track to be searched;

means for reading a clock frequency of a zone to which the target track belongs, from the memory means when the moving means is driven, and generating a master clock having this frequency;

means for detecting a data clock from the reproduction signal;

means for comparing the data clock detected with the master clock, and correcting a frequency of the master clock in accordance with a comparison result; and means for detecting a start of a sector region from the reproduction signal by the master clock, and demodulating reproduction data from the reproduction signal in the sector region by the data clock in accordance with the detection.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An optical disk apparatus according to an embodiment of the present invention will now be described with reference to drawings.

Figure 1:
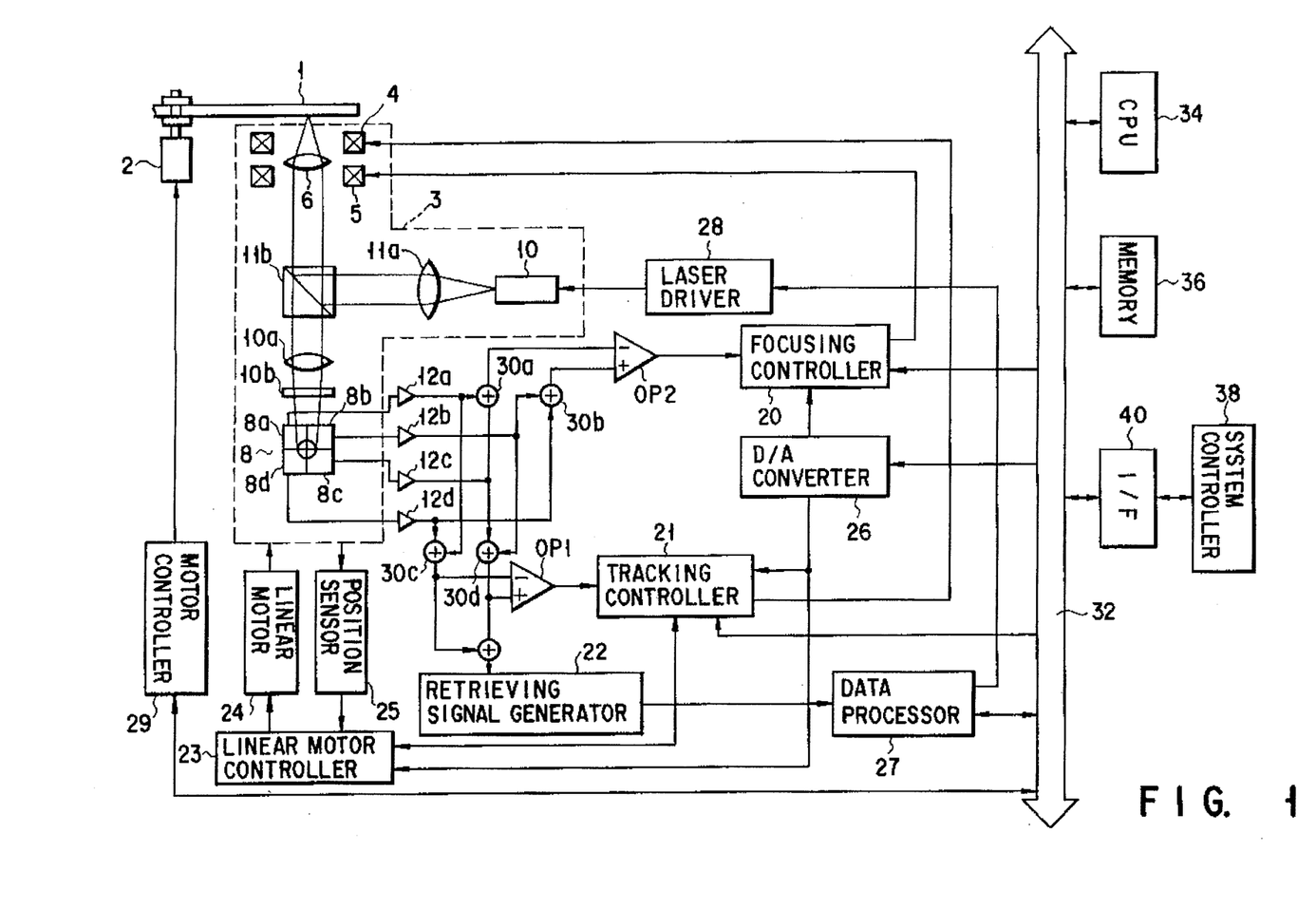
FIG. 1 is a schematic block diagram showing an optical disk apparatus according to an embodiment of the present invention.

FIG. 1 is a block diagram showing a brief structure of an optical disk apparatus of the present invention, for example, an image filing apparatus. In the disk apparatus shown in FIG. 1, an optical detector 8, a semiconductor laser 10 and an optical system are built in an optical head 3, which is mounted on a carriage (not shown). The head is held movably in the radial direction of an optical disk 1 by a linear motor 24. In the optical head 3 having such a structure, an optical beam generated from the semiconductor laser 10 is collimated by a collimator lens 11a, and guided to an objective lens 6 via a half prism 11b. The laser beam is converged by the objective lens 6 onto the optical disk 1. The optical disk 1 is rotated at a constant rotation speed by the motor 2 controlled by a motor controller 29.

In the reproduction mode, a reproduction laser beam having a constant light intensity is generated from the semiconductor laser 10. In the recording mode, a recording laser beam whose light intensity has been modulated by a recording signal, to be larger than that of the reproduction beam, is generated from the semi-conductor laser 10. In the erase mode, an erasing laser beam having a light intensity larger than that of the reproduction beam, is generated from the semiconductor laser 10.

The reflection light beam is directed from the optical disk 1 back to the objective lens 6, and the reflection light beam emerged from the objective lens 6 is allowed to pass through the half mirror 11b, then directed to an astigmatism detection optical system which consists of a focusing lens 10a and a cylindrical lens 10b. The light beam, as passing through the detection optical system, is concentrated and output onto an optical detector 8 including four optical detection cells 8a, 8b, 8c and 8d. Thus, an optical beam spot is formed on the detector 8. The shape of the beam spot formed on the detector 8 varies in accordance with the focusing state of the objective lens 6, and therefore the focusing state can be checked by detecting the variation of the beam shape by the optical detection cell 8a, 8b, 8c and 8d. Further, the tracking state of the objective lens 1, which indicates whether or not the light beam is accurately following a track on the optical disk 1, can be checked by detecting the beam spot by the optical detection cells 8a, 8b, 8c and 8d, since the image of the track is formed in the beam spot on the detector 8. In the reproduction mode, a reproduction light beam is modulated while it reflects on the optical disk, and the modulated optical beam is made incident on the optical detector 8. Therefore, a reproduction signal can be generated by adding the detection signals from the optical detector 8 together.

The optical detection cells 8a, 8b, 8c and 8d are connected respectively to amplifiers 12a, 12b, 12c and 12d. Detection signals from the amplifiers 12a and 12c are added up by an adder 30a, whereas detection signals from the amplifiers 12b and 12d are added up by an adder 30b. Addition signals from the adders 30a and 30b are applied to an operation amplifier OP2. Therefore, a difference signal which corresponds to the difference between the two addition signals, is generated from the operation amplifier OP2 as a focus signal, and the focus signal is applied to a focusing controller 20. On the other hand, detection signals from the amplifiers 12a and 12d are added up by an adder 30c, whereas detection signals from the amplifiers 12b and 12c are added up by an adder 30d. Addition signals from the adders 30c and 30d are applied to an operation amplifier OP1. Therefore, a difference signal which corresponds to the difference between the two addition signals, is generated from the operation amplifier OP1 as a tracking signal, and the tracking signal is applied to a tracking controller 21. Further, addition signals from the adders 30c and 30d are added up by an adder 30e, and supplied to a retrieving signal generator 22 as a retrieving signal.

A coil driving signal for driving a focusing driving coil 5 is generated from the focus controller 20 in response to a focus signal, and the objective lens 6 is driven in its optical axis direction by the focusing driving coil 5. Thus, the objective lens 6 is maintained in a focus state at all times, and an optical beam is focalized on the optical disk 1 by the objective lens 6. Further, a driving signal for driving the driving coil 4 for tracking is generated from the tracking controller 21 in response to a tracking signal, and the objective lens 6 is moved in the direction normally crossing its optical axis, and directed onto the track on the optical disk 1 at all times. Therefore, the objective lens 6 is maintained in the tracking state, and the light beam from the objective lens 6 is rendered to follow the target track.

When a tracking error exceeds a range that can be corrected by the driving coil 4 for tracking, a signal is applied to a linear motor controller 23, and a driving signal is applied from the linear motor controller 23 to a liner motor 24, thus driving the linear motor 24. Consequently, the carriage on which the optical head 3 is placed, is finely moved. Coupled with the fine movement of the carriage, the objective lens 6 is moved such that the light beam follows the target track by the driving coil 4 for tracking. The linear motor 24 is operated as described, so as to move the objective lens always to a position where a track error can be corrected.

The position of the carriage on which the optical head 3 is placed, is detected by a position detector 25. A position signal from the position detector 25 is transmitted to a CPU 34 via the linear motor controller 23, a D/A converter 26 and a bus 32. With this structure, the CPU 34 is able to monitor the position of the carriage at all times. When accessing to a target track, the track number of the target track, which is input from outside, and the track number of the track currently searched are compared by the CPU 34, and the movement signal corresponding to the difference therebetween is applied from the CPU 34 to the linear motor controller 23 via the D/A converter 26, thus driving the linear motor 24. Therefore, when accessing, the carriage is quickly moved so as to search the target track. For the accessing, an access signal is applied from the CPU 34 to the focusing controller 20 and the tracking controller 21 via the D/A converter 26, and the objective lens 5 is moved to the home position with respect to the focusing and tracking operations.

In the reproduction mode, a reproduction driving signal having a constant level is applied from a laser driver 28 to the semiconductor laser 10, and a reproduction light beam is generated from the semiconductor laser 10. Further, a digitized reproduction signal is generated from the laser retrieving signal generator 22, and applied to a data processor 27, which will be explained later, where the signal is converted into reproduction data. The reproduction data is applied to the CPU 34 via the bus 32, and stored in a memory 36. In the recording mode, recording data is supplied from a system controller 38, which is outside the optical disk apparatus, to the bus 32 via an interface 40, and thus the recording data is supplied to the data processor 27 under the control of the CPU 36. The recording data is converted by the data processor 27 into a recording signal, which is supplied to the laser driver 28. The semiconductor laser 10 is driven by a driving signal which corresponds to the recording signal, and a laser beam whose intensity has been modulated in accordance with the recording signal is generated from the semi-conductor laser 10.

Figure 2:
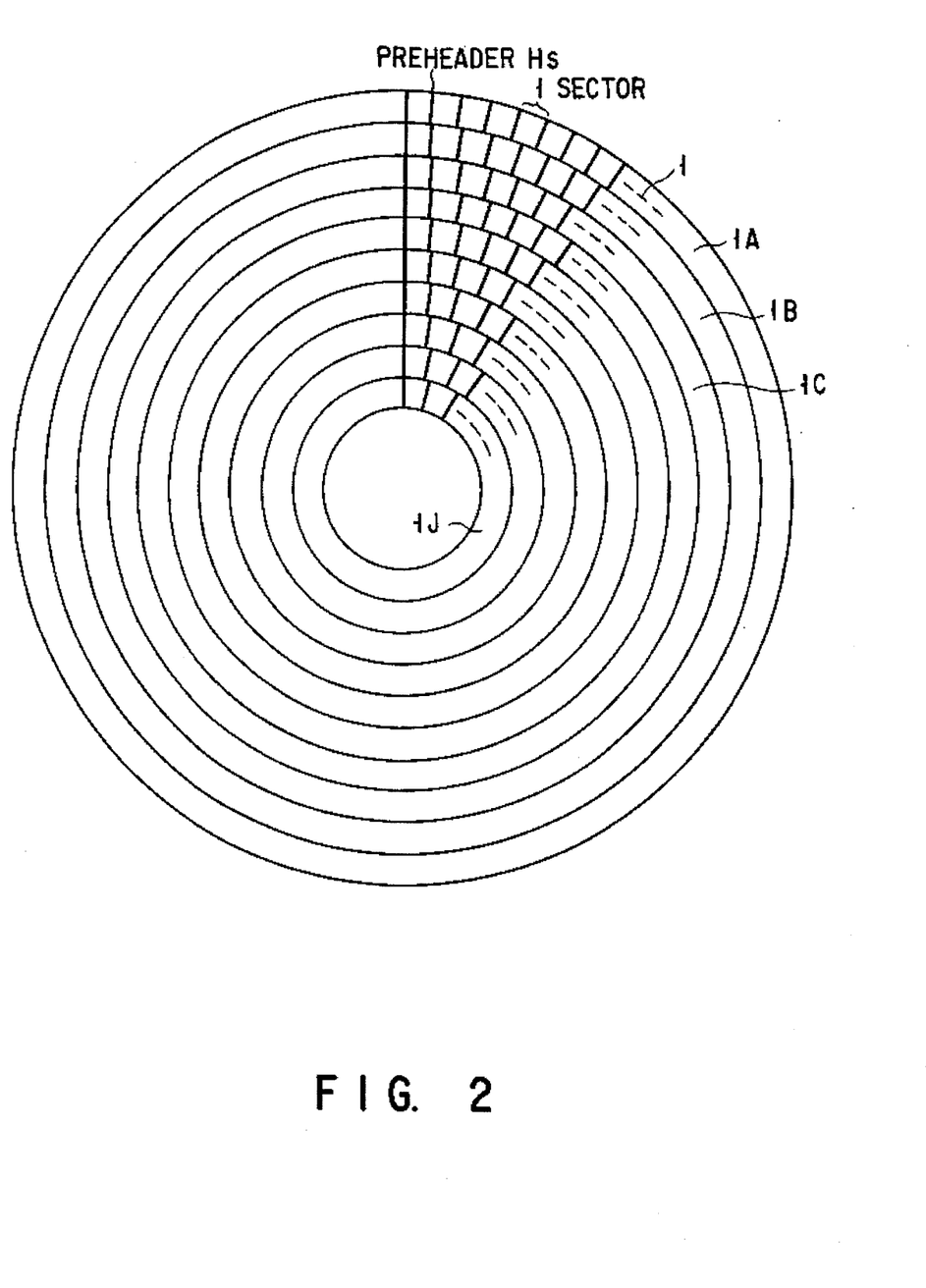
FIG. 2 is a plan view illustrating the relationship between zones and sectors of an optical disk used for the optical disk apparatus shown in FIG. 1.
Figure 3:
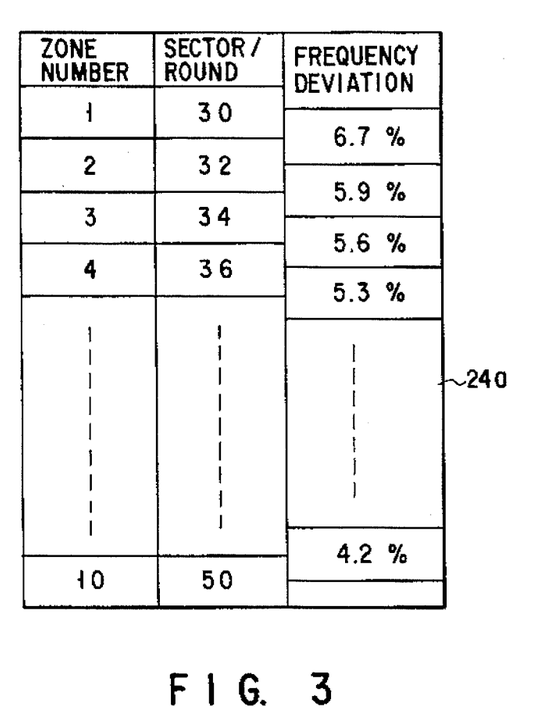
FIG. 3 is an explanatory diagram illustrating the number of sectors of one track in each zone shown in FIG. 2, and the frequency deviation of reproduction signals.

As shown in FIG. 2, the optical disk 1 which has been formatted by the Z.CAV mode or the M.CAV mode has tracks arranged in substantially a coaxial manner, which are divided into a plurality of band regions defined in the radial direction. For example, an optical disk may be formed to have ten zones 1A to 1J, each having a plurality of tracks, and which are also divided into a plurality of sectors along the circumferential direction, each being a unit of recording data. The number of sectors is the same within one zone. Further, data clocks each having a particular frequency are assigned for the zones 1A to 1J for reproduction/recording of data from/on a track in a zone, and a data clock is prerecorded in the header portion Hs of the track. The frequency deviation of the data clocks between zones adjacent to each other, is defined to 6.7% to 4.3%, and the number of sectors within one track differs from one zone from another among 1A to 1J. FIG. 3 shows the relationship between the frequency deviation of the data clock assigned to each of the zones 1A to 1J, and the number of sectors in one track, and such relationships are stored in a table 24a of the memory shown in FIG. 1. In other words, the memory 24 has a zone management table, in which the number of sectors per track (one round) in each zone (area number), memory for each zone, and the frequency deviations of the data clocks, shown in FIG. 3, are stored.

Figure 4:
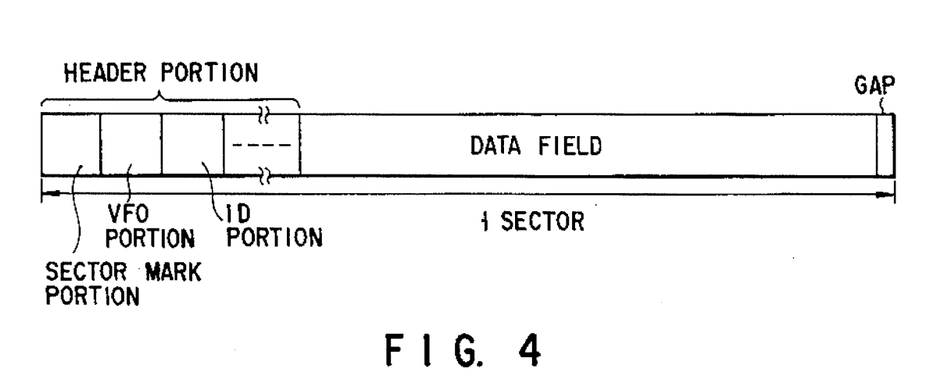
FIG. 4 is a diagram showing a header portion, which is pre-format data, and a data field, as of one unit sector of a track in a zone shown in FIG. 2.

Each of the zones 1A to 1J of the optical disk 1, as can be seen in FIG. 4, consists of a header portion, which is a pre-format area prerecorded as format data, and a data field which a data area in which the user can store data afterwards. In the header portion, a sector mark portion SM for expressing the start of a sector, a VFO portion in which a synchronous code is recorded, and an ID portion ID in which ID data is recorded are arranged periodically in a plurality of times. At the ultimate end of the data field, a gap region in which no data is recorded, is provided in order to clarify the border between the data field and the next sector.

Figure 5A:
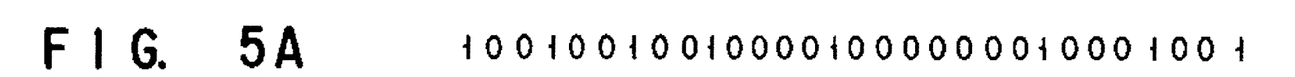
FIGS. 5A, 5B and 5C are, respectively, an example of a digitized signal to be recorded in the sector shown in FIG. 4, a pit mark to be recorded in the track in accordance with the digitized signal, and a signal wave-form reproduced from the pit mark.
Figure 5B:
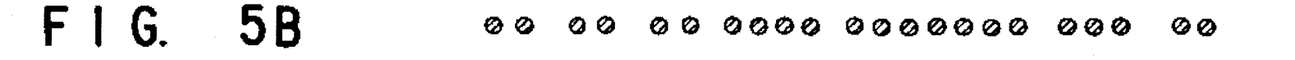

The VFO portion, the ID data portion and the data field store data which are (2–7)-modulated, i.e. modulated data in the mode in which 2 to 7 "0"'s are inserted between "1" and "1" as shown in FIG. 5A. Based on the modulated data, a pit mark shown in FIG. 5B is formed on the optical disk 1, and the pit mark is reproduced as a signal shown in FIG. 5C. In the ID portion, a track number, a sector number and a CRC code are recorded as ID data. In the VFO portion, a synchronous code in which "1" is read out at a constant period, such as "100100100 . . . " is recorded. The code is set in the manner that "1" shown in FIG. 6A is read out while 3 data clocks are generated as shown in FIG. 6B. In short, the data is synchronized with a data clock B in phase to read the data, the data clock B being supplied from a PLL circuit 45, which will be described later. In such a synchronous code, as long as an interval between a pulse and pulse is not detected to be 2 or 4 clocks, not 3 clocks, the erroneous reading does not occur.

Figure 7A:
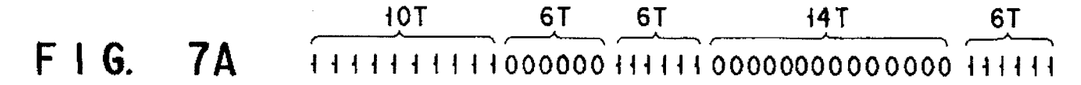
FIGS. 7A, 7B and 7C are, respectively, an example of a digitized signal to be recorded as a sector mark, an example of such a pit mark, and a signal waveform reproduced from the pit mark.
Figure 7B:
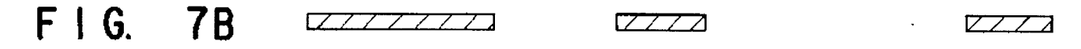
Figure 7C:
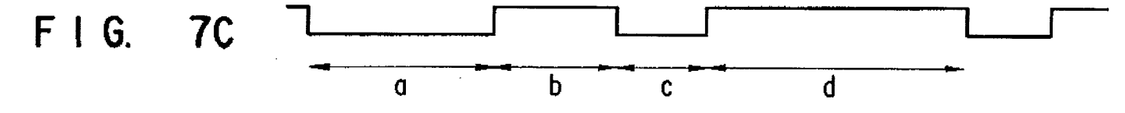
Figure 9A:
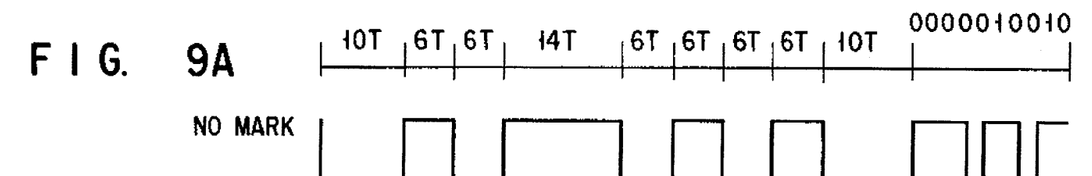
FIGS. 9A and 9B are diagrams showing, respectively, a sector mark pattern and a reproduction signal thereof.
Figure 9B:
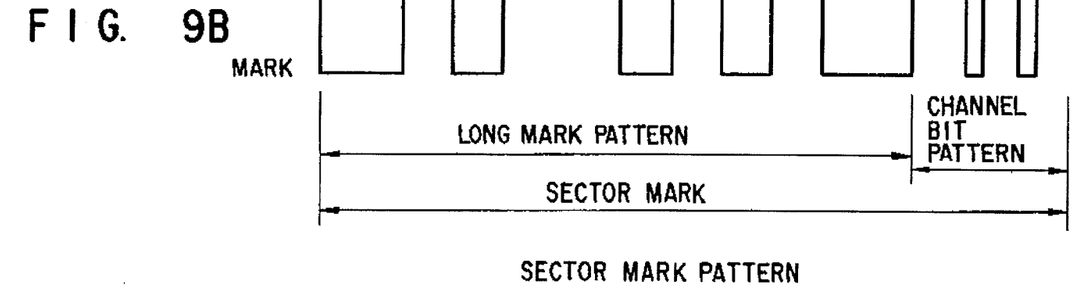

In the sector mark portion, a mark ("0" or "1" is repeated in a plurality of times) is actually formed on the optical disk 1 as shown in FIGS. 7A to 7C. The sector mark pattern stored in the sector mark portion consists of long mark patterns, respectively, corresponding to 10 data clocks A within a block a, 6 data clocks A within a block b, 6 data clocks A within a block c, 14 data clocks A within a block d, 6 data clocks A within a block e to block h, and 10 data clocks A within a block i, as shown in FIGS. 9A and 9B, and a channel bit pattern "0000010010".

Figure 8:
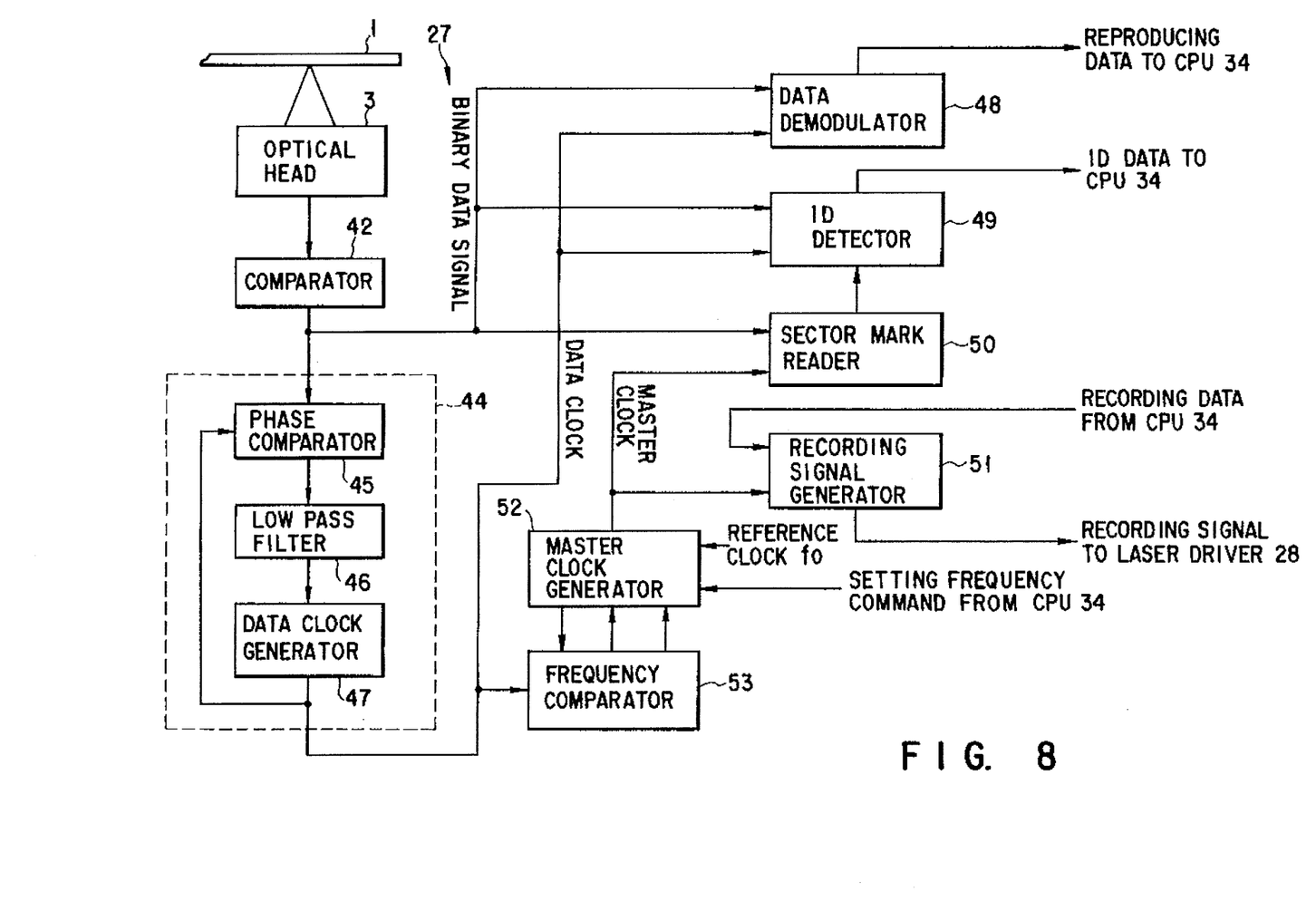
FIG. 8 is a block diagram showing a data processor shown in FIG. 1.

These signals are supplied as reproduction signals to the data processor 27 shown in FIG. 1, where the signals are converted into ID data as pre-format data, that is, address data (track number, sector number, etc.) and reproduction data. The data processor 27 consists of circuits such as shown in FIG. 8. With this structure, as shown in FIG. 8, an addition signal from the optical head 3 is digitized in the comparator 42 in the retrieving signal generator 22, and then supplied to the data processor 27 as a reproduction signal. The digitized reproduction signal from the comparator 42 is supplied to a data clock PLL44 which generates a data clock, a data demodulator for demodulating reproduction data from the digitized reproduction signal, an ID detector 49 for detecting ID data from the digitized signal, and a sector mark reader 50 for detecting a sector mark from the digitized signal.

Figure 5C:
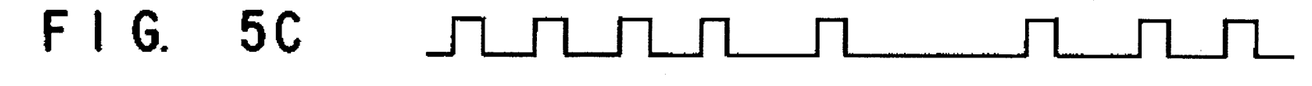
Figure 6A:
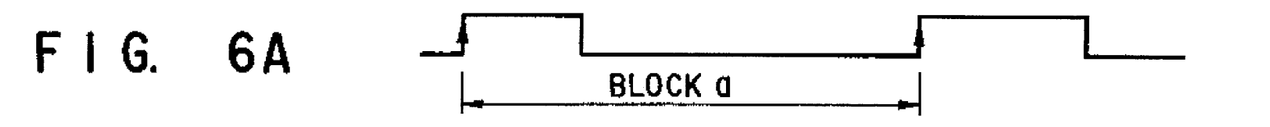
FIGS. 6A and 6B shows waveforms of a digitized signal and a data clock for demodulating this signal, respectively.
Figure 6B:
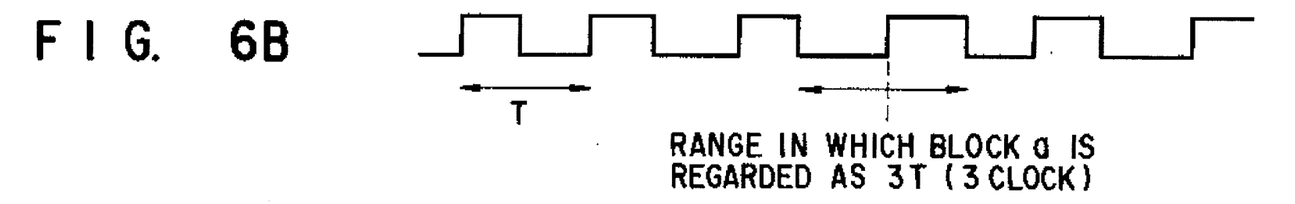

In the data clock PLL44, the data clock already generated from a data clock generator 47 and the synchronous code shown in FIG. 5C and contained in the reproduction signal from the VFO portion shown in FIG. 4 are compared with each other by the phase comparator 45, and the harmonic component is removed by a low-pass filter 46. Then, the comparison result is supplied to the data clock generator 47 as a voltage signal. In other words, in the data clock PLL44, the data clock synchronized with the synchronous code contained in the reproduction signal from the VFO portion, is generated.

The data clock is supplied to the data demodulator 48 for demodulating the reproduction data from the digitized reproduction signal by the data clock, the ID detector 49 for demodulating ID data from the digitized reproduction signal by the data clock, and the frequency comparator 53 for comparing the data clock and the master clock.

In the data processor 27, a master clock generator 52 for generating a master clock is provided. When data is reproduced from a track of a zone, the CPU 34 selects a frequency particular-to that zone from the table of the memory 24, and instructs the set frequency to the master clock generator 52 as a frequency set command. In accordance with this instruction, the master clock generator 52 generates a master clock of the set frequency, with reference to a reference frequency f0. The master clock is supplied to a sector mark reader 50, a recording signal generator 51 and a frequency comparator 53.

In the case where a light beam actually searches a track of the zone designated by the CPU 34, the master clock and the data clock reproduced from the VFO coincide with each other. In this case, a sector mark shown in FIG. 7A is detected by the sector mark reader 50 from the digitized reproduction signal as a sector mark signal shown in FIG. 7C or FIG. 9B. By this detection, the start of search of a sector in the designated zone is recognized by the sector mark reader 50, and the sector mark reader 50 instructs the start of reading of the ID data to the ID detector 49, thus driving the ID detector 49. With the ID detector 49 driven, the track number, sector number and CRC code ID are read out as ID data from the digitized reproduction signal by the data clock, and the ID data is stored in the memory 24 via the CPU 34. The reproduction signal searched from the data field, following the detection of the ID mark, is demodulated to reproduction data by the data demodulator 48 with reference to the data clock. More specifically, in the demodulator 42, the (2–7) code is demodulated from the digitized signal from the comparator 41, and the reproduction data contained in the reproduction signal is reproduced. The reproduction data is stored in the memory 24 via the CPU 34 as in the case of the ID data.

In the case where a light beam searches a track of a zone other than that designated by the CPU 34 by access error, the master clock and the data clock reproduced from the VFO do not coincide with each other. In this case, a sector mark is not detected by the sector mark reader 50 from the digitized reproduction signal, and therefore the ID detector 49 is not driven. Such a discrepancy between the data clock and the master clock is detected by the frequency comparator 53.

The frequency comparator 53 compares the data clock and the master clock data clock with each other. When the frequency of the data clock is higher than that of the master clock, a frequency ascending command is output to the master clock generator 52, whereas when the frequency of the data clock is lower than that of the master clock, a frequency descending command is output to the data clock generator 46. When the frequency of the master clock is made equal to that of the data clock, the master clock is locked up with the frequency.

Further, in the case where a light beam searches a track of a zone other than that designated by the CPU 34 by access error, the frequency of the master clock generated from the master clock generator 52 is corrected on the basis of the command output from the frequency comparator 47 while detecting a track of at least one sector, and thus the data clock and the master clock is rendered coincide with each other. Therefore, even if an access error occurs, the sector mark is detected by the sector mark reader 50 during search, and the ID data and reproduction data of the zone currently searched are supplied from the ID detector 49 and the data demodulator 48, respectively, to the CPU 34. Thus, the track of the currently searched zone can be recognized by the CPU 34 despite that an access error occurs, and therefore the target track can be searched by repeating the access operation once again.

In the recording mode, recording data is supplied to the recording signal generator 51 from the memory 36 via the CPU 34. The recording data is (2–7)-modulated by the master clock from the master clock generator 52, and converted into a recording signal. The recording signal is applied to the laser driver 28, thus recording the recording data in the data field of one sector.

As described above, when the optical head 3 moves to a particular zone, the master clock generator 52 generates a master clock corresponding to the designated frequency in response to the frequency set command from the CPU 23. If the optical head moves to a location other than the target zone due to an erroneous access operation, the sector mark cannot be detected. However, the frequency of the data clock is changed to that corresponding to the zone currently set by the reproduction signal to VFO, contained in the digitized signal from the comparator 42. Thus, the frequency of the data clock and that of the master clock are compared with each other by the frequency comparator 52, and the frequency of the master clock is changed to correspond to the frequency of the zone currently searched by the optical head 3. Consequently, in a sector, the sector mark can be read by the sector mark reader 50, thereby obtaining address data.

Therefore, even if the deviation of the frequency is ±12.5% to −16%, the ID data can be read by correcting the frequency as described.

In the above-described embodiment, an optical disk is used; however, an optical magnetic disk may be also used.

As described above in detail, according to the present invention, there is provided an optical disk apparatus handling an optical disk which is divided into a plurality of zones, each consisting of a plurality of tracks arranged in a radial direction, which is capable of correcting a data clock to the particular frequency of a zone even if the optical head moves to a location apart from the target zone.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical data reproducing apparatus for reproducing data from an optical disk having a plurality of tracks for storing data that are arranged in a coaxial manner, said tracks being grouped into a plurality of zones partitioning said optical disk along a radial direction thereof, each zone having a plurality of sectors that are each assigned as a unit area for recording data, the tracks in a same zone being divided by a same number of sectors, and the sectors of each zone storing a data clock, the data clock for each zone varying in frequency from one zone to another, each data clock being used for reading out data from the sectors of a corresponding zone, said apparatus comprising:

means for rotating said optical disk at a constant rotation speed;

means for converging an optical beam on a track of said optical disk, for detecting an optical beam reflecting from said optical disk, and for generating a reproduction signal based on the optical beam detected;

means for moving said converging means in a radial direction of said disk;

means for storing frequencies of clocks which are different from one zone to another;

means for driving said moving means by generating a driving signal corresponding to a target track to be searched;

means for reading a clock frequency of a zone corresponding to said target track, from said storing means when said moving means is driven, and for generating a master clock based on the clock frequency read;

means for detecting a data clock from said reproduction signal;

means for comparing said data clock detected with said master clock, and for correcting a frequency of said master clock in accordance with a comparison result; and means for detecting a start of a sector based on said reproduction signal and said master clock, and for demodulating reproduction data from said reproduction signal in said sector using said data clock in accordance with the detection of the start of the sector.

2. An optical data reproducing apparatus according to claim 1, wherein said sectors each include a sector mark for specifying a head of its sector, and said sector mark is detected from said reproduction signal by said master clock.

3. An optical data reproducing apparatus according to claim 1, wherein said means for generating said reproduction signal includes means for digitizing said reproduction signal.

4. An optical data reproducing apparatus according to claim 2, wherein said means for detecting said data clock includes means for generating a comparison signal by comparing a data clock output from said data clock detecting means and a digitized reproduction signal, and means for changing a frequency of said data clock in accordance with said comparison signal.

5. An optical data reproducing apparatus according to claim 1, wherein said sectors each have a track address of a track to which that sector belongs, a sector address for specifying a sector, a portion in which a synchronous signal corresponding to the data clock of the sector, is stored, and a data field for recording data.

6. An optical data reproducing apparatus for reproducing data from an optical disk having a plurality of zones partitioning said optical disk along a radial direction thereof, each zone having a plurality of sectors that are each assigned as a unit area for recording data, and each of said sectors storing a sector mark for indicating a start and a particular mark for generating a particular synchronous clock signal that has a different frequency from one zone to another and that is synchronized with in-phase data to read data from a corresponding sector in a reproduction mode, said apparatus comprising:

means for reading the sector mark and the particular mark from one of said sectors;

means for moving said reading means toward a target one of said zones;

means for storing a plurality of reference frequencies particular to the synchronous clocks stored in the particular marks of said zones, respectively;

means for selecting one of said reference frequencies and for generating a target clock signal having the selected reference frequency in accordance with the target zone;

means for decoding a particular synchronous frequency from the particular mark read by said reading means and for generating a clock signal having the decoded frequency;

means for detecting the sector mark with the decoded clock signal generated by said decoding means; and means for correcting the reference clock based on the decoded clock signal.

7. An optical data reproducing apparatus for reproducing data from an optical disk having a plurality of tracks for storing data that are arranged in a coaxial manner, said tracks being grouped into a plurality of zones partitioning said optical disk along a radial direction thereof, each zone having a plurality of sectors that are each assigned as a unit area for recording data, the tracks in a same zone being divided by a same number of sectors, and the sectors of each zone storing a data clock, the data clock for each zone varying in frequency from one zone to another, each data clock being used for reading out data from the sectors of a corresponding zone, said apparatus comprising:

a rotating mechanism for rotating said optical disk at a constant rotation speed;

a converging mechanism for converging an optical beam on a track of said optical disk, for detecting an optical beam reflecting from said optical disk, and for generating a reproduction signal based on the optical beam detected;

a moving mechanism for moving said converging mechanism in a radial direction of said disk;

a storage device for storing frequencies of clocks which are different from one zone to another;

a driver for driving said moving mechanism by generating a driving signal corresponding to a target track to be searched;

a reader for reading a clock frequency of a zone corresponding to said target track, from said storage device when said moving mechanism is driven, and for generating a master clock based on the clock frequency read;

a first detector for detecting a data clock from said reproduction signal;

a device for comparing said data clock detected with said master clock, and for correcting a frequency of said master clock in accordance with a comparison result; and a second detector for detecting a start of a sector based on said reproduction signal and said master clock, and for demodulating reproduction data from said reproduction signal in said sector using said data clock in accordance with the detection of the start of said sector.

8. An optical data reproducing apparatus for reproducing data from an optical disk having a plurality of zones partitioning said optical disk along a radial direction thereof, each zone having a plurality of sectors that are each assigned as a unit area for recording data, and each of said sectors storing a sector mark for indicating a start and a particular mark for generating a particular synchronous clock signal which has a different frequency from one zone to another and is synchronized with in-phase data to read data from a corresponding sector in a reproduction mode, said apparatus comprising:

a reading mechanism for reading the sector mark and the particular mark from one of said sectors;

a moving mechanism for moving said reading mechanism toward a target one of said zones;

a storage device for storing a plurality of reference frequencies particular to the synchronous clocks stored in the particular marks of said zones, respectively;

a selector for selecting one of said reference frequencies and for generating a target clock signal having the selected reference frequency in accordance with the target zone;

a decoder for decoding a particular synchronous frequency from the particular mark read by said reading mechanism and for generating a clock signal having the decoded frequency;

a detector for detecting the sector mark with the decoded clock signal generated by said decoder; and a correcting mechanism for correcting the reference clock based on the decoded clock signal.

* * * * *